UNITED STATES PATENT OFFICE.

HORACE L. BOWKER, OF BOSTON, MASSACHUSETTS.

IMPROVEMENT IN PROCESSES FOR MAKING BEER, &c.

Specification forming part of Letters Patent No. 118,901, dated September 12, 1871.

*To all whom it may concern:*

Be it known that I, HORACE L. BOWKER, of Boston, in the county of Suffolk and State of Massachusetts, have invented a certain Process for Mixing and Making Beer, &c., of which the following is a specification:

The object of my invention is to increase the effervescence of common small-beers or sirups by mixing and dissolving therein an alkali of any kind, and to draw carbonic-acid gas mixed with water in it, when I am able to obtain a more palatable and pleasant beer or sirup than has heretofore been produced, besides increasing the effervescence of the liquid very effectually, as will herein be described.

It has been customary to draw from a fountain or otherwise carbonic-acid gas mixed with water into a vessel containing the sirup of any required flavor, but in so doing the effervescence of the compound is soon destroyed and the drink loses its freshness. To avoid this difficulty I mix the sirup or beer, or any other liquid, made, for instance, from the extracts of roots, herbs, &c., with an alkali of any suitable kind, such as, for instance, carbonate of soda, carbonate of lime, or any other alkali that may prove advantageous. This mixture or solution of beer, sirups, &c., with alkali constitutes the flavor of the drink, and all that is necessary to produce a healthful and invigorating drink of great and lasting effervescence is to draw therein carbonic acid mixed with water from a fountain or otherwise, when the carbonic acid contained in the alkali previously mixed with the beer or sirup will increase the effervescence of the liquid in a great degree. This is simply illustrated by taking any common sirup and mixing it or dissolving therein a small quantity of an alkali—for instance, carbonate of soda—and pouring into the sirup so fixed carbonic-acid gas and water, when it will be found that the effervescence of the liquid lasts much longer than if the experiment is made without the alkali above named.

The beer or sirup as made with my improved process is of a more cooling and refreshing nature, as the effervescence of the same is of a longer duration.

Having thus described the nature and operation of my invention, I wish to secure by Letters Patent, and claim—

1. The process, as herein described, of mixing any sirup, small-beer, water, &c., with an alkali, and drawing or charging therein carbonic-acid gas mixed with water or otherwise, for the purpose as herein fully set forth and described.

2. The process of mixing beer materials with carbonic-acid gas mixed with water, for the purpose of increasing its healthful properties, in a manner set forth.

HORACE L. BOWKER.

Witnesses:
 ALBAN ANDRÉN,
 WM. H. HUTCHINSON.